(12) United States Patent
Tatsuta

(10) Patent No.: US 10,782,533 B2
(45) Date of Patent: Sep. 22, 2020

(54) WEARABLE DEVICE AND ADJUSTMENT METHOD

(71) Applicant: OLYMPUS CORPORATION, Tokyo (JP)

(72) Inventor: Seiji Tatsuta, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 147 days.

(21) Appl. No.: 16/210,106

(22) Filed: Dec. 5, 2018

(65) Prior Publication Data

US 2019/0113760 A1    Apr. 18, 2019

Related U.S. Application Data

(63) Continuation of application No. PCT/JP2016/069510, filed on Jun. 30, 2016.

(51) Int. Cl.
| | | |
|---|---|---|
| *G02B 27/14* | (2006.01) | |
| *G09G 5/00* | (2006.01) | |
| *G02B 27/01* | (2006.01) | |
| *G02B 27/02* | (2006.01) | |

(52) U.S. Cl.
CPC ......... *G02B 27/0176* (2013.01); *G02B 27/02* (2013.01); *G02B 2027/0154* (2013.01); *G02B 2027/0178* (2013.01)

(58) Field of Classification Search
CPC ............... G02B 27/0176; G02B 27/02; G02B 2027/0154; G02B 2027/0178
USPC .............................................. 359/630; 345/8
See application file for complete search history.

(56) References Cited

U.S. PATENT DOCUMENTS

| | | |
|---|---|---|
| 6,680,802 B1 | 1/2004 | Ichikawa et al. |
| 2007/0058261 A1 | 3/2007 | Sugihara |
| 2017/0090202 A1 | 3/2017 | Tatsuta |
| 2017/0184861 A1 | 6/2017 | Lammers-Meis et al. |

(Continued)

FOREIGN PATENT DOCUMENTS

| | | |
|---|---|---|
| JP | 2001-107943 A | 4/2001 |
| JP | 2001-108935 A | 4/2001 |

(Continued)

OTHER PUBLICATIONS

International Search Report dated Sep. 20, 2016 issued in PCT/JP2016/069510.

(Continued)

*Primary Examiner* — William Choi
(74) *Attorney, Agent, or Firm* — Scully Scott Murphy & Presser

(57) ABSTRACT

A wearable device includes a wearable element mounted on a head of a wearer, a display that displays an image in a part of a field of view of the wearer, an arm that holds the display, and a coupling element that couples the arm and the wearable element to each other. The coupling element includes a first rotation mechanism capable of rotating the arm around a first axis, and a second rotation mechanism that is provided closer to the wearable element than the first rotation mechanism is, and is capable of rotating the arm with a degree of freedom including rotation around a second axis and a third axis, the second axis being orthogonal to the first axis, the third axis being orthogonal to the second axis and intersecting with the first axis.

11 Claims, 12 Drawing Sheets

(56) References Cited

U.S. PATENT DOCUMENTS

2019/0113759 A1 4/2019 Tatsuta
2019/0179409 A1 6/2019 Jones et al.

FOREIGN PATENT DOCUMENTS

| | | |
|---|---|---|
| JP | 2004-080679 A | 3/2004 |
| JP | 2005-043701 A | 2/2005 |
| JP | 2005-252591 A | 9/2005 |
| JP | 2006-003879 A | 1/2006 |
| JP | 2010-226680 A | 10/2010 |
| JP | 2012-105117 A | 5/2012 |
| JP | 2012-105118 A | 5/2012 |
| JP | 2014-007513 A | 1/2014 |
| JP | 2017-068045 A | 4/2017 |
| WO | WO-2016203556 A1 * 12/2016 | ......... G02B 27/0176 |

OTHER PUBLICATIONS

International Search Report dated Sep. 13, 2016 issued in PCT/JP2016/068642.
Office Action dated Nov. 8, 2019 received in U.S. Appl. No. 16/210,093.
United States Notice of Allowance dated Apr. 22, 2020 received in related application U.S. Appl. No. 16/210,093.

* cited by examiner

WEARABLE DEVICE AND ADJUSTMENT METHOD

CROSS REFERENCE TO RELATED APPLICATION

This application is a continuation of International Patent Application No. PCT/JP2016/069510, having an international filing date of Jun. 30, 2016, which designated the United States, the entirety of which is incorporated herein by reference.

BACKGROUND

A wearable device (head-mounted display) that is worn on the head of the user and projects an image within the field of view of the user is known. For example, JP-A-2004-80679, and JP-A-2006-3879 disclose technology that relates to such a wearable device.

JP-A-2004-80679 discloses a head mounted display having the following configuration. Specifically, a display is held by an earpad of a headphone via an arm. The earpad and the arm are coupled to each other via a coupling element rotatable at least around axes in a left and right direction and an upward and downward direction. The arm and the display are coupled to each other via a coupling element rotatable at least around axes in the left and right direction and the upward and downward direction.

JP-A-2006-3879 discloses a pupil-division see-through-type head-mounted display. The technology disclosed in JP-A-2006-3879 significantly reduces the size of an eyepiece element (eyepiece window) that projects (emits) a virtual image of a display image to implement see-through display (i.e., display in which the external field of view and the display image overlap each other), and see-around display (i.e., display in which a wide external field of view is provided).

The head mounted display requires the display to be adjusted to an appropriate position, and further requires detailed adjustment (alignment) to make a direction of an optical axis appropriately match a visual axis, for enabling the user to appropriately visually recognize a display screen. JP-A-2004-80679 described above discloses an example of a conventional technique for performing such adjustment. The technique features utilization of a multi-axis joint for enabling detailed adjustment of the position of the display and the orientation of the optical axis.

SUMMARY

According to one aspect of the invention, there is provided a wearable device comprising:
a wearable element mounted on a head of a wearer;
a display that displays an image in a part of a field of view of the wearer;
an arm that holds the display; and
a coupling element that couples the arm and the wearable element to each other;
wherein the coupling element includes:
a first rotation mechanism capable of rotating the arm around a first axis; and
a second rotation mechanism that is provided closer to the wearable element than the first rotation mechanism, and is capable of rotating the arm with a degree of freedom including rotation around at least a second axis and a third axis, the second axis being orthogonal to the first axis, the third axis being orthogonal to the second axis and intersecting with the first axis.

In the adjustment method for the wearable device, the method may comprise adjusting the first axis to be in parallel with a direction along both eyes of the wearer by rotating the arm with the second rotation mechanism.

In the adjustment method for the wearable device, the method may comprise:
adjusting the second axis to be in parallel with an upward-downward direction of the head by rotating the arm around the third axis; and
adjusting the first axis to be in parallel with a direction along both eyes of the wearer by rotating the arm around the second axis.

DESCRIPTION OF EXEMPLARY EMBODIMENTS

Figure 1:
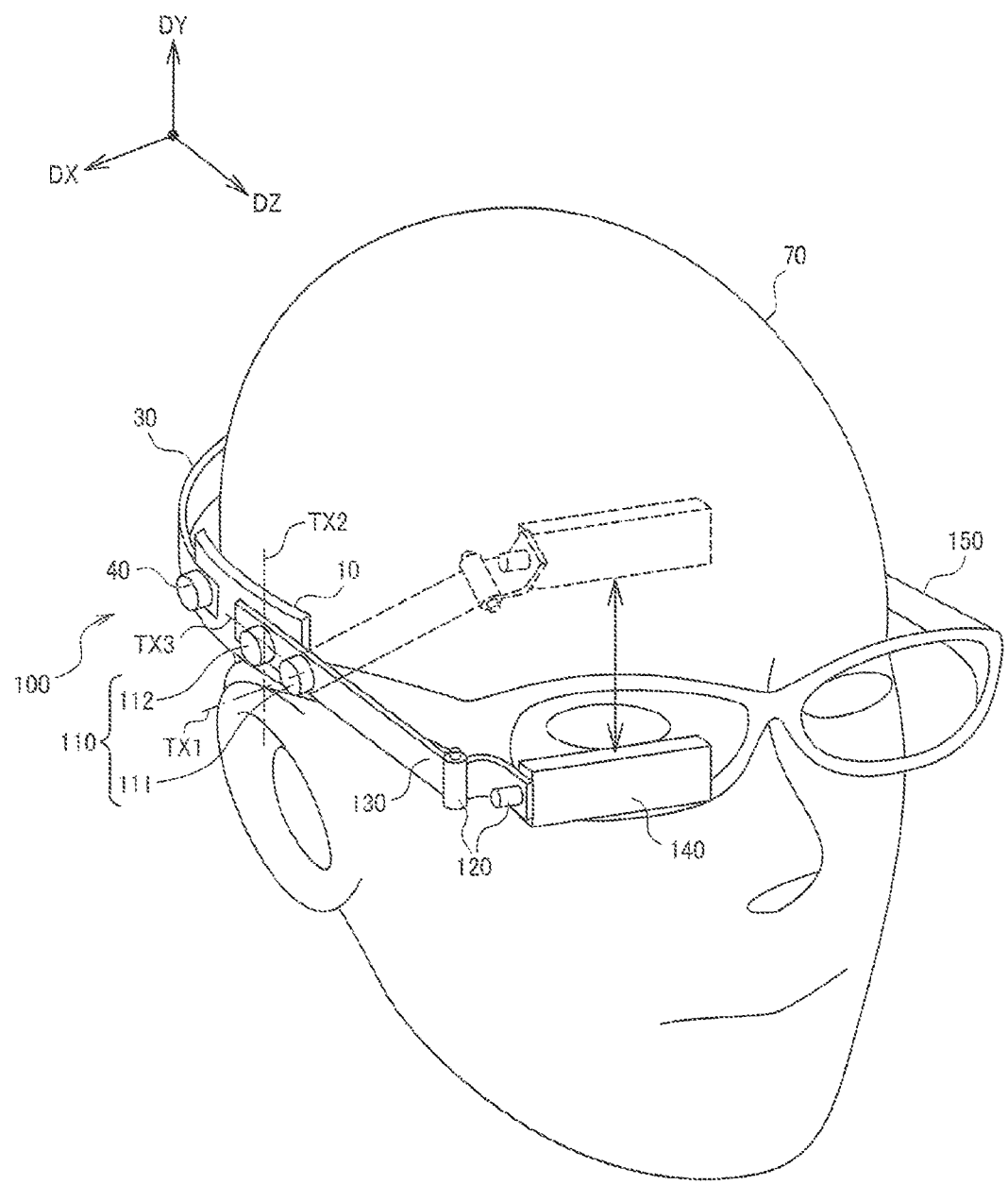
FIG. 1 is a perspective view of a wearable device being worn on a head of a user.

During actual use of a head mounted display, a display may need to be temporarily retracted from a position in front of an eye. For example, the head mounted display may be used in factories and warehouses to display information for assisting operations. In such a case, the operations may be more easily performed with the display temporarily retracted. A user who wants to see the display image again after the retraction needs to perform the detailed adjustment as described above again. It is extremely cumbersome to perform the detailed adjustment each time the display is retracted and restored.

For example, a small head mounted display (JP-A-2006-3879 described above) having a display with a relatively small eye-box (a tolerable range of deviation between the line of sight and the optical axis (a range of deviation still enabling the display image to be visually recognized)) requires detailed adjustment for the optical axis. Time consuming alignment performed for each retraction and restoration not only involves cumbersome adjustment but might even degrade work efficiency. Thus, restoration after retraction is desirably achieved with a simple operation.

One aspect of the present embodiment relates to a wearable device including a wearable element mounted on a head of a wearer, a display that displays an image in a part of a field of view of the wearer, an arm that holds the display, and a coupling element that couples the arm and the wearable element to each other, in which the coupling element includes a first rotation mechanism capable of rotating the arm around a first axis, and a second rotation mechanism that is provided closer to the wearable element than the first rotation mechanism is, and is capable of rotating the arm with a degree of freedom including rotation around a second axis and a third axis, the second axis being orthogonal to the first axis, the third axis being orthogonal to the second axis and intersecting with the first axis.

According to one aspect of the present embodiment, the second rotation mechanism that is provided closer to the wearable element than the first rotation mechanism is can rotate the arm around the second axis that is orthogonal to the first axis and the third axis that is orthogonal to the second axis and intersects with the first axis, and thus, the first axis can be adjusted to be in parallel with a direction along both eyes of the wearer. Once such adjustment and position adjustment/alignment of the display are completed, the display is retracted and restored with the arm rotated around the first axis, and thus can be retracted and restored with a simple operation.

Exemplary embodiments of the invention are described below. Note that the following exemplary embodiments do not in any way limit the scope of the invention laid out in the claims. Note also that all of the elements described below in connection with the exemplary embodiments should not necessarily be taken as essential elements of the invention.

1. Configuration

Figure 2:
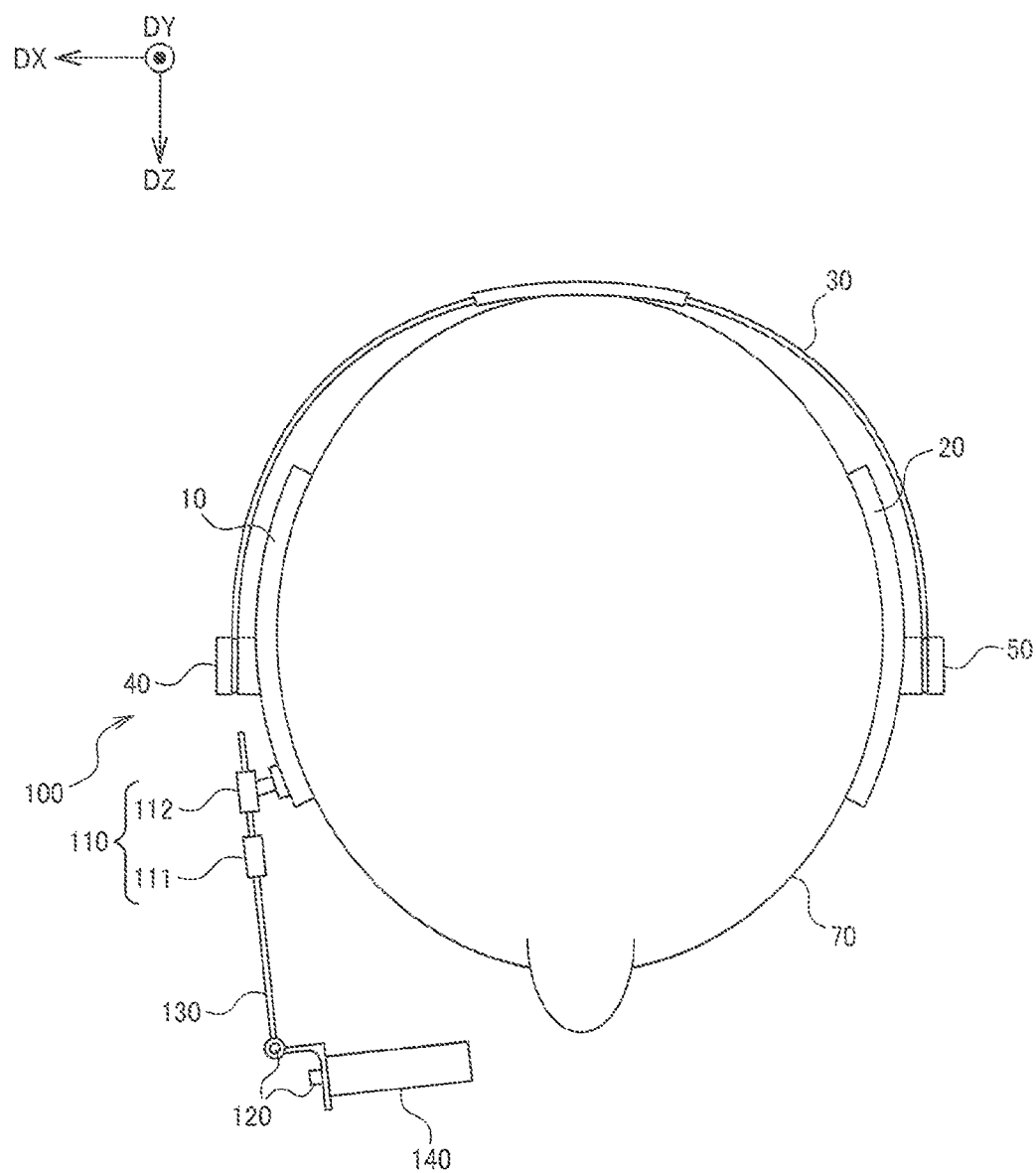
FIG. 2 is a top view of the wearable device being worn on the head of the user.

FIG. 1 and FIG. 2 illustrate a configuration example of a wearable device 100 according to the present embodiment. FIG. 1 is a perspective view of the wearable device 100 being worn on a head 70 of a user. FIG. 2 is a top view of the wearable device 100 being worn on the head 70 of the user.

In FIGS. 1 and 2, directions DX, DY, and DZ orthogonal to each other (may be substantially orthogonal to each other, and thus intersect each other in a broader sense). The direction DX is a rightward direction (a direction from the center of the head 70 toward the right side of the head) as viewed from the user. The direction DY is an upward direction (a direction from the center of the head 70 toward the top of the head) as viewed from the user. The direction DZ is a forward direction (a direction from the center of the head 70 toward the forward side of the face) as viewed from the user.

The wearable device 100 includes a wearable element (head mount), an arm 130, a coupling element 110, and a display 140 (display device). The wearable device 100 may further include a rotation mechanism 120.

The wearable element is worn on the head 70 of the user (wearer), and is a device (mechanism, part) that for holding the arm 130 and the display 140 on the head 70. Specifically, the wearable element includes a first contact element 10 (first contacting element), a second contact element 20 (second contacting element), a headband 30, a first coupling element 40, and a second coupling element 50. The configuration of the wearable element is not limited to this. For example, the wearable element may have a headphone-like configuration with an earpad (earpad portion).

The arm 130 is coupled (connected) to the first contact element 10 via the coupling element 110, and holds the display 140 at a position (for example, in front of an eye of the user) desired by the user. The arm 130 is a linear or curved bar shaped member for example. For example, the arm 130 has one end coupled (connected) to the display 140 via the rotation mechanism 120 and has the other end connected to the wearable element via the coupling element 110. The coupling element 110 does not necessarily need to be provided to the end of the arm 130, and may be provided to be separated from the end of the arm 130. A slide mechanism or the like for adjusting the length of the arm 130 may further be provided.

The display 140 is provided to the end of the arm 130 and displays an image in a part of the field of view of the user. Specifically, the display 140 is configured to guide light (image) output from a display device to an eyepiece window through an optical system, and emit the guided light from the eyepiece window toward the pupil of the eyeball (i.e., emit the guided light in the direction along the line of sight of the eyeball (visual axis direction)) to display an enlarged virtual image of the image within the field of view (i.e., project the image onto the retina). The optical system includes a prism, a mirror, a lens, and the like for example.

For example, the display 140 may utilize a pupil-division see-through optical system. The pupil-division see-through optical system is designed so that the exit pupil of the optical system is set at a point around the eyepiece lens (eyepiece window) such that the size of the eyepiece lens can be reduced. Since the size of the eyepiece lens is small, light enters the pupil of the eye from the external field of view through the outside of the eyepiece lens to implement see-through display. When using the pupil-division see-through optical system, the width of the end part (in which the eyepiece window is provided) of the display 140 is 4 mm or less, for example. The display 140 is not limited to the pupil-division see-through optical system, and may utilize various optical systems other than the pupil-division see-through optical system.

The rotation mechanism 120 holds the display 140 in such a manner as to be rotatable relative to the arm 130, and can rotate around an axis in parallel to a horizontal scan direction of a display image for example. Alternatively, the rotation mechanism 120 may be rotatable around an axis orthogonal to (including a substantially orthogonal, and thus intersecting in a broader sense) the axis. For example, the rotation mechanism 120 may be rotatable around an axis in parallel with the direction DZ or the direction DY, in a state where the display 140 is adjusted to be in front of the eye of the user with the axis in parallel with the horizontal scan direction of the display image set to be in parallel with the direction DX. Alternatively, the rotation mechanism 120 may be freely rotatable around these three axes.

The coupling element 110 is a mechanism (part) coupling the arm 130 and the wearable element with each other, and holds the arm 130 to be rotatable with respect to the wearable element. Specifically, the coupling element 110 includes a first rotation mechanism 111 and a second rotation mechanism 112.

The first rotation mechanism 111 enables the arm 130 to rotate around a first axis TX1. The second rotation mechanism 112 is disposed closer to the wearable element than the first rotation mechanism 111 is, and enables the arm 130 to rotate with a degree of freedom including rotation around the second axis TX2 and the third axis TX3. The second axis TX2 is orthogonal to the first axis TX1. The third axis TX3 is orthogonal to the second axis TX2, and intersects with (not in parallel with) the first axis TX1. Thus, adjacent two axes (the first and the second axes TX1 and TX2, the second and the third axes TX2 and TX3) of the three axes are orthogonal to each other. The direction of the first axis TX1 changes when the rotation around the second axis TX2 occurs. Thus, an angle between the third axis TX3 and the first axis TX1 is variable (not necessarily 90°).

The expression "rotatable with a degree of freedom including rotation around the second axis TX2 and the third axis TX3" includes capability of rotating around the second axis TX2 or the third axis TX3 only, capability of further rotating around other axes, and capability of rotating around any axis as in a case where a ball joint is used for example.

In the embodiment described above, the display 140 can be retracted and restored through a simple operation of adjusting the direction of the first axis TX1 of the first rotation mechanism 111 with the second rotation mechanism 112 provided closer to the wearable element than the first rotation mechanism 111 is, and then rotating the arm 130 around the first axis TX1. Specifically, after adjusting the direction of the first axis TX1 and adjusting the display 140 (with the rotation mechanism 120 for example) to be at an optimum position and in an optimum alignment state for the user to visually recognize the display image, the retraction and restoration can be performed with the first axis TX1 only. Thus, the restoration requires no detailed position adjustment or alignment, and the arm 130 may be simply rotated around the first axis TX1 until the display 140 restores the original position.

Specifically, in a state where the wearable device 100 is worn on the head 70, the first axis TX1 corresponding to the first rotation mechanism 111 is adjusted to be in parallel with the direction (DX) along both eyes of the user, with the arm 130 rotated by the second rotation mechanism 112.

In a state where the first axis TX1 has been adjusted to be in parallel with the direction (DX) along both eyes of the user, the arm 130 and the display 140 moves in an upward-downward direction (substantially in the direction DY or −DY) when the arm 130 rotates around the first axis TX1. Thus, retraction and restoration can be achieved through a natural motion and with a lower risk of the arm 130 and the display 140 interfering with an object worn by the user such as an eyewear. Specifically, when the first axis TX1 is inclined with respect to the left and right direction (when the first axis TX1 is in parallel with the direction DX rotated in a counterclockwise direction as viewed from the top of the head for example), a plane orthogonal to the first axis TX1 is likely to intersect with a frame or a temple of an eyewear. The arm 130 moving within such a plane by rotating around the first axis TX1 is likely to come into contact with the frame or the temple of the eyewear. The present embodiment can avoid such a situation.

The wearable element has the following configuration. Specifically, the first contact element 10 and the second contact element 20 are members (parts) that come into contact with the temporal regions of the user (wearer). The term "come into contact with" as used herein means touching and contacting. The contact elements 10 and 20 are each formed of an elastic member having a longitudinal direction extending along the forward and backward direction of the head 70 in a state where the wearable device 100 is worn on the head 70 of the user, and are curved to conform with the curved shape of the temporal region in the forward and backward direction. In FIG. 1 and FIG. 2, the forward and backward direction of the head 70 corresponds to the direction DZ (and −DZ). The headband 30 couples the first contact element 10 and the second contact element 20 to each other, and biases the first contact element 10 and the second contact element 20 toward the temporal regions. The term "bias" as used herein means application of force in a certain direction. The first coupling element 40 couples the first contact element 10 and the headband 30 with each other. The second coupling element 50 couples the second contact element 20 and the headband 30 with each other.

The contact elements 10 and 20, which come into contact with the head 70, thus having a small width in the upward-downward direction and being elongated in the forward and backward direction is less affected by a difference among individual users (such as a difference in the shape of the head or hairstyle, or whether or not the user is wearing a worn object such as an eyewear or a hearing aid other than the wearable device). The contact elements 10 and 20 are biased by the headband 30 to come into close contact with the temporal region, due to the curved shape and the elasticity of the contact elements 10 and 20. Thus, the contact elements 10 and 20 can be in stable contact with the temporal regions and the display can be stably held regardless of the difference among individual users in the shape of the head.

As described above, the configuration of the wearable element is not limited to this, and the method and the configuration of the coupling element 110 according to the present embodiment can be applied to various wearable elements used as the head wearable element of a head mounted display.

2. Detailed Configuration and Adjustment Method

Figure 3:
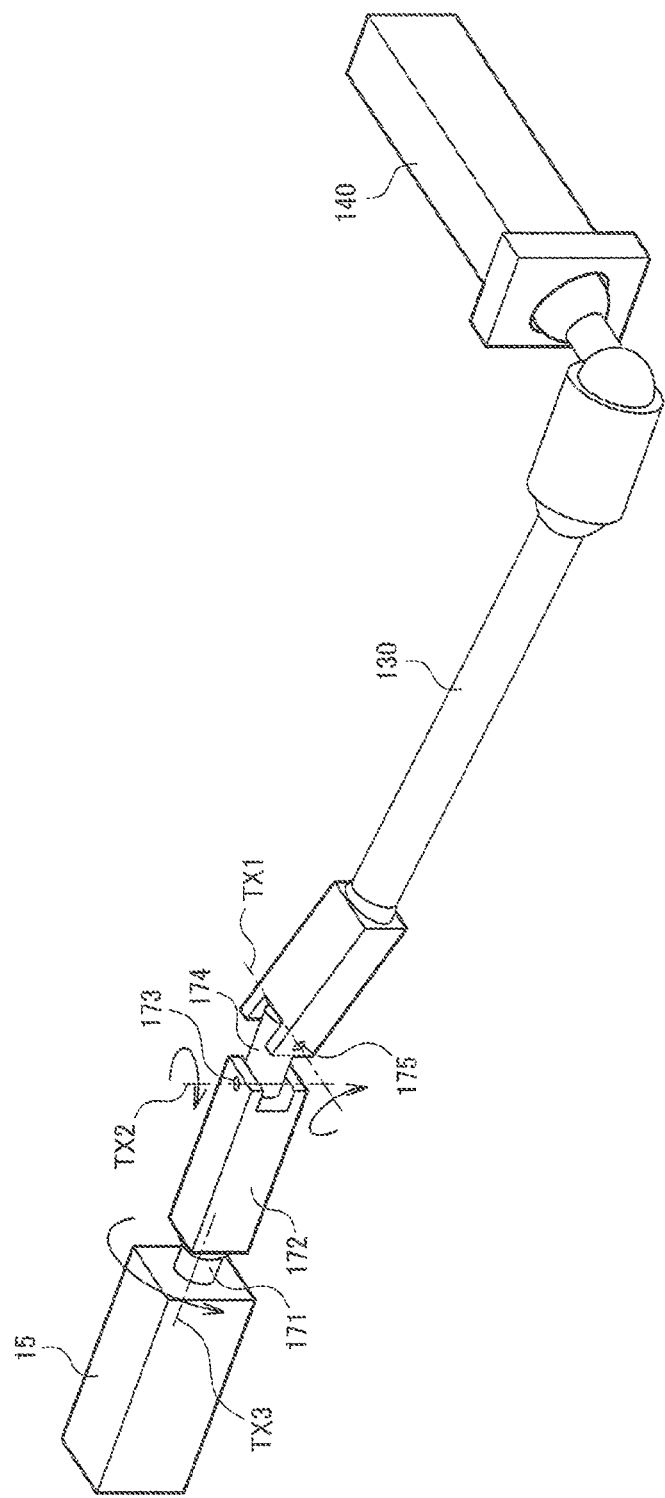
FIG. 3 illustrates a detailed configuration example of a coupling element.

FIG. 3 illustrates a detailed configuration example of the coupling element 110. The coupling element 110 includes members (parts) 15 and 171 to 175 made of resin or the like for example.

The arm 130 has one end coupled to the display 140 and the other end provided with a first joint rotating around the first axis TX1. The first joint is coupled with one end of the first link (member 174), and the other end of the first link is provided with a second joint rotating around the second axis TX2. The second joint is coupled with one end of a second link (member 172), and the other end of the second link is provided with a third joint rotating with a degree of freedom including rotation around the third axis TX3. The third joint is coupled with a base (member 15) fixed to the first contact element 10. The first joint corresponds to the first rotation mechanism 111 in FIGS. 1 and 2, and the second and the third joints correspond to the second rotation mechanism 112.

More specifically, each of the first and the second joints is a pin joint rotating around a single pin serving as an axis. The arm 130 has the other end provided with a rectangular U-shaped (U-shaped) recess. One end of the first link (member 174) is inserted in the recess. The pin 175 penetrates through the recess and one end of the first link. Similarly, the second link (member 172) has one end provided with a rectangular U-shaped (U-shaped) recess. The other end of the first link (member 174) is inserted in the recess. The pin 173 penetrates through the recess and the other end of the first link. The rotation around the first axis TX1 and the second axis TX can be implemented by rotation around the pins 175 and 173 serving as axes. The first axis TX1 and the second axis TX2 are orthogonal to each other, and thus the pins 175 and 173 are provided to be orthogonal to each other.

The third joint is a ball joint enabling free rotation with a degree of freedom including rotation around three axes. Specifically, the second link (member 172) has the other end provided with a ball receiver of the third joint (a hole in which the ball of the member 171 fits). The member 171 is a ball portion of the ball joint and has a structure with the ball protruding from one end of the member 15 serving as the base. The rotation with a degree of freedom including rotation around the third axis TX3 is implemented with the ball and the ball receiver freely sliding on each other (sliding movement). The third axis TX3 is orthogonal to the second axis TX2, and extends along the longitudinal direction of the second link (member 172) for example. The rotation of the second link with the longitudinal direction of the second link serving as the rotation axis results in rotation around the third axis TX3. The ball joint may enable the rotation of the second link around a direction orthogonal to the longitudinal direction of the second link.

The shape of each of the members is as follows for example. The member 174 serving as the first link and the member 172 serving as the second link are each a rod-like member having a circular or rectangular column shape. The member 15 serving as the base has a rectangular column shape for example. The members 15 and 171 are integrally formed for example. The shape of the member 15 is not limited to this. For example, the member 15 may be a plate-like member curved along the curved shape of the first contact element 10. Alternatively, the member 15 may be omitted with the member 171 directly fixed to or integrally formed with the first contact element 10.

As described above, the second rotation mechanism 112 illustrated in FIG. 1 and FIG. 2 includes the second axis rotation mechanism (second joint) capable of rotating the arm 130 around the second axis TX2, and the third axis rotation mechanism (third joint) capable of rotating the arm 130 with a degree of freedom including rotation around the third axis TX3. The third axis rotation mechanism is provided closer to the wearable element than the second axis rotation mechanism is.

With the first axis TX1, the second axis TX2, and the third axis TX3 individually provided in such a manner that two adjacent axes are orthogonal to each other, the first axis TX1 can easily be adjusted to be in the direction along both eyes by adjusting the axes one by one from the side of the contact element. Specifically, the rotation around the third axis TX3 changes the direction of the second axis TX2 orthogonal to the third axis TX3. The rotation around the second axis TX2 after the direction of the second axis TX2 is determined changes the direction of the first axis TX1 orthogonal to the second axis TX2, and thus the direction of the first axis TX1 can be determined. In this manner, adjustment can be implemented through a simple procedure that can be easily understood by the user. This adjustment method will be described in detail later.

With the second axis TX2 in the direction orthogonal to the first axis TX1 independently provided, the retraction and the restoration of the display 140 through the rotation around the first axis TX1 is less likely to result in the rotation of the arm 130 around the second axis TX2 orthogonal to the first axis TX1. Thus, the retraction and the restoration can be performed with a reduced risk of ruining the position and the alignment state of the display 140 due to erroneous rotation around the second axis TX2. Furthermore, the ball joint may be set to have large friction, a lock mechanism may be provided, or the other like countermeasure may be taken to reduce a risk of erroneous rotation around the third axis TX3.

In the present embodiment, the third axis rotation mechanism (third joint) is a joint enabling rotation around any axis including the third axis TX3, and is the ball joint as described above for example.

This configuration enables an extension direction of the arm 130 relative to the first contact element 10 (member 15) to be freely adjusted, and the rotation around the third axis TX3 in the direction. Specifically, the first contact element 10 is in contact with the temporal region, and thus may be in various directions depending on the difference between individual users in the shape of the head 70. This means that the arm 130 is oriented differently among individual users, and thus the display 140 might fail to be held at an appropriate position. In view of this, the present embodiment enables the orientation of the arm 130 to be freely changed by the third axis rotation mechanism, so that the display 140 can be adjusted to be at an appropriate position.

When the user is wearing an eyewear or the like, the arm 130 might interfere with the temple of the eyewear. In view of this, the present embodiment enables the arm 130 to be oriented in a direction away from the temple of the eyewear by the third axis rotation mechanism. The arm 130 can be rotated around the third axis TX3 while being at a position oriented in any direction.

Next, the adjustment method for the wearable device 100 using the coupling element 110 is described with reference to FIGS. 4 to 6.

Figure 4:
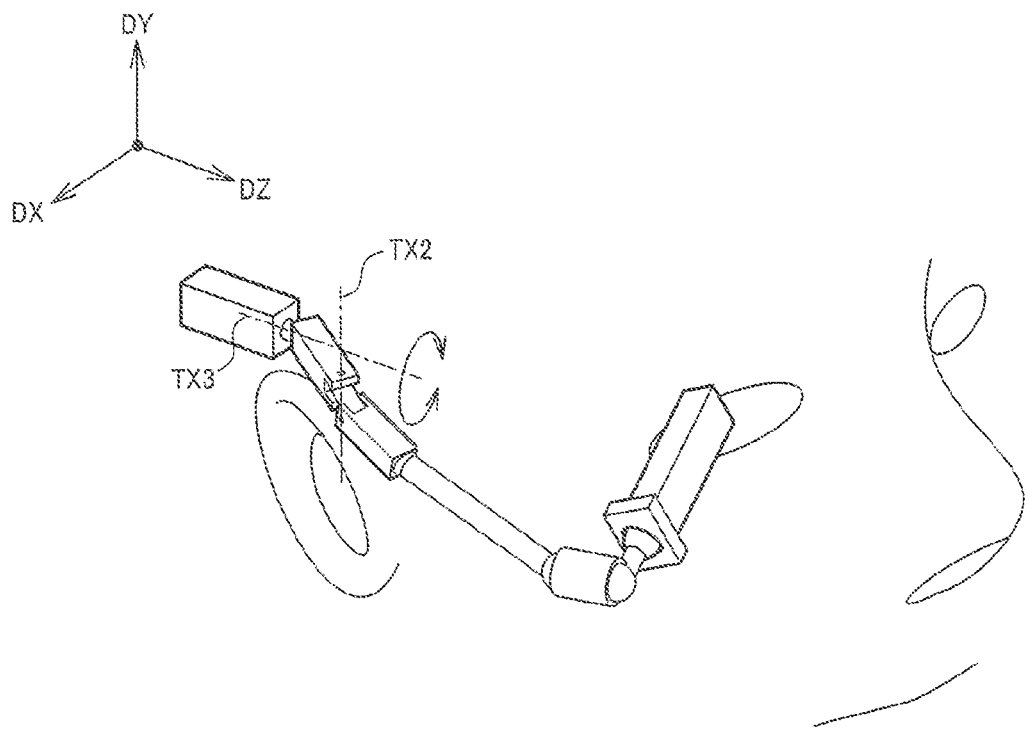
FIG. 4 is a view illustrating an adjustment method for the wearable device using the coupling element.

First of all, as illustrated in FIG. 4, in a state where the wearable device 100 is worn on the head 70, the second axis TX2 is adjusted to be in parallel with the upward-downward direction (DY) of the head 70 with the arm 130 rotated around the third axis TX3. In this process, the orientation and the position of the arm 130 are adjusted as appropriate by using the third joint. At the same time, the second axis TX2 is adjusted to be in parallel with the upward-downward direction (DY) of the head 70. This adjustment is performed by applying force onto the second link (member 172) with a finger while holding the base (member 15) with hand for example.

Figure 5:
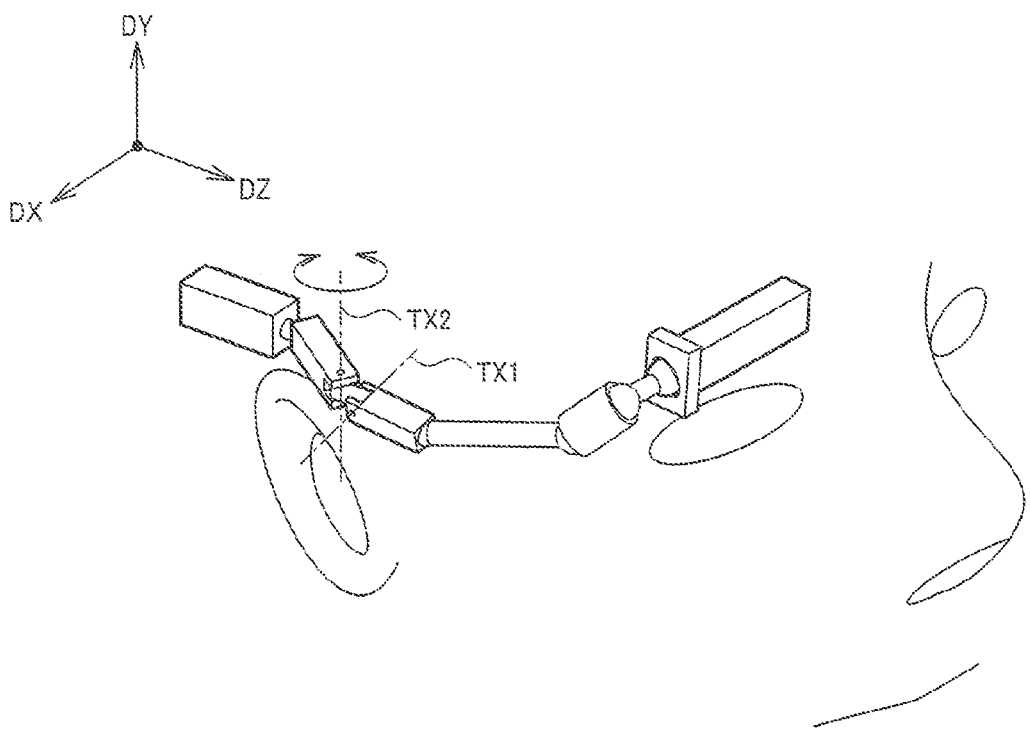
FIG. 5 is a view illustrating an adjustment method for the wearable device using the coupling element.

Next, as illustrated in FIG. 5, the first axis TX1 is adjusted to be in parallel with the direction (DX) along both eyes of the user with the arm 130 rotated around the second axis TX2. This adjustment is performed by applying force onto the arm 130 with a finger while holding the base (member 15) or the second link (member 172) with hand for example.

Figure 6:
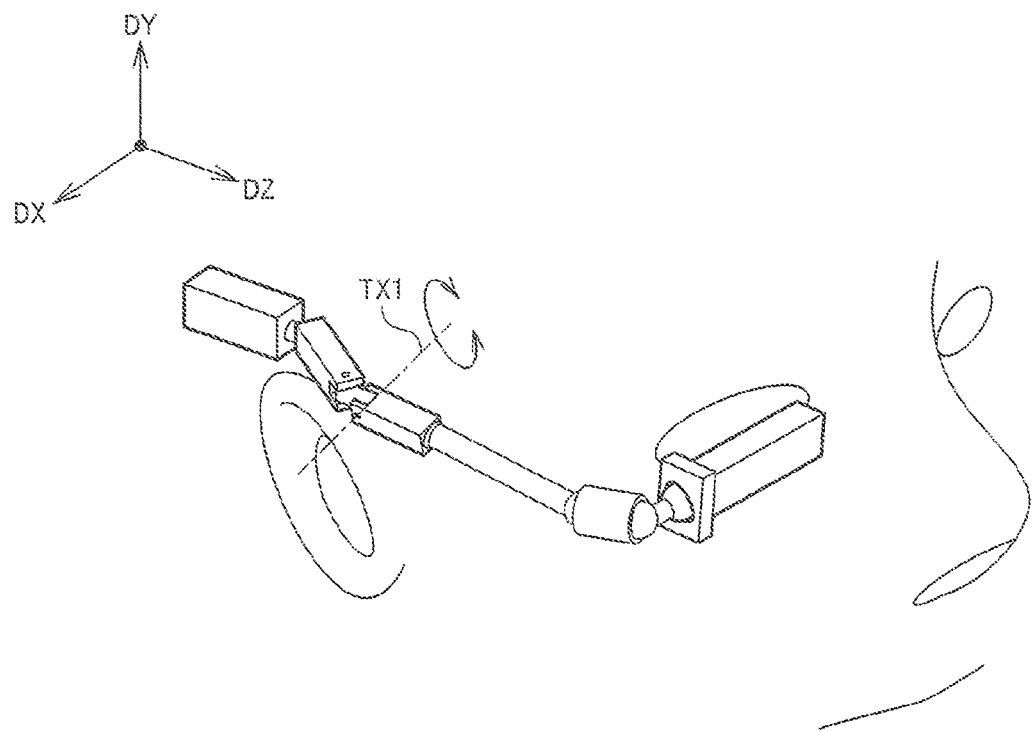
FIG. 6 is a view illustrating an adjustment method for the wearable device using the coupling element.

Next, as illustrated in FIG. 6, the arm 130 is rotated around the first axis TX1 so that the position of the display 140 is adjusted to bring the display image to a position, within the field of view, desired by the user. For example, the adjustment is performed to arrange the eyepiece element of the display 140 in front of an eye. In this process, adjustment (alignment) is performed by using the rotation mechanism 120 that rotates the display 140 relative to the arm 130 so that the optical axis of the display 140 matches the visual axis (the optical axis of the eyeball in a state where the line of sight is directed to the eyepiece element).

The present embodiment features the rotation mechanisms rotating around the first axis TX1, the second axis TX2, and the third axis TX3 with two adjacent axes orthogonal to each other individually provided to enable the adjustment method described above to be performed. Specifically, the first axis TX1 is adjusted to be in parallel with the left and right direction (DX) with the axes adjusted one by one from the third axis TX3 close to the wearable element, whereby the display 140 can be adjusted to be in front of the eye. These three axes thus provided enables the adjustment to be performed with a high degree of freedom, and can be adjusted one by one so that simple adjustment is performed through a procedure that can be easily remembered.

Figure 7:
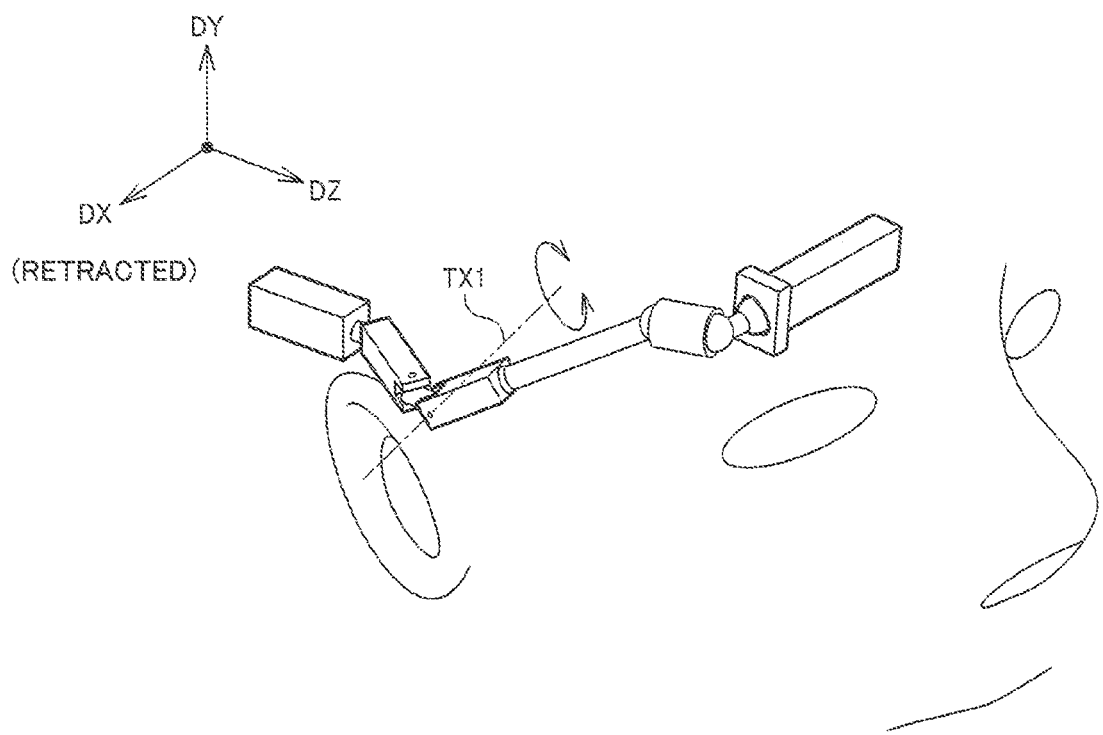
FIG. 7 is a view illustrating retraction and restoration of a display.
Figure 8:
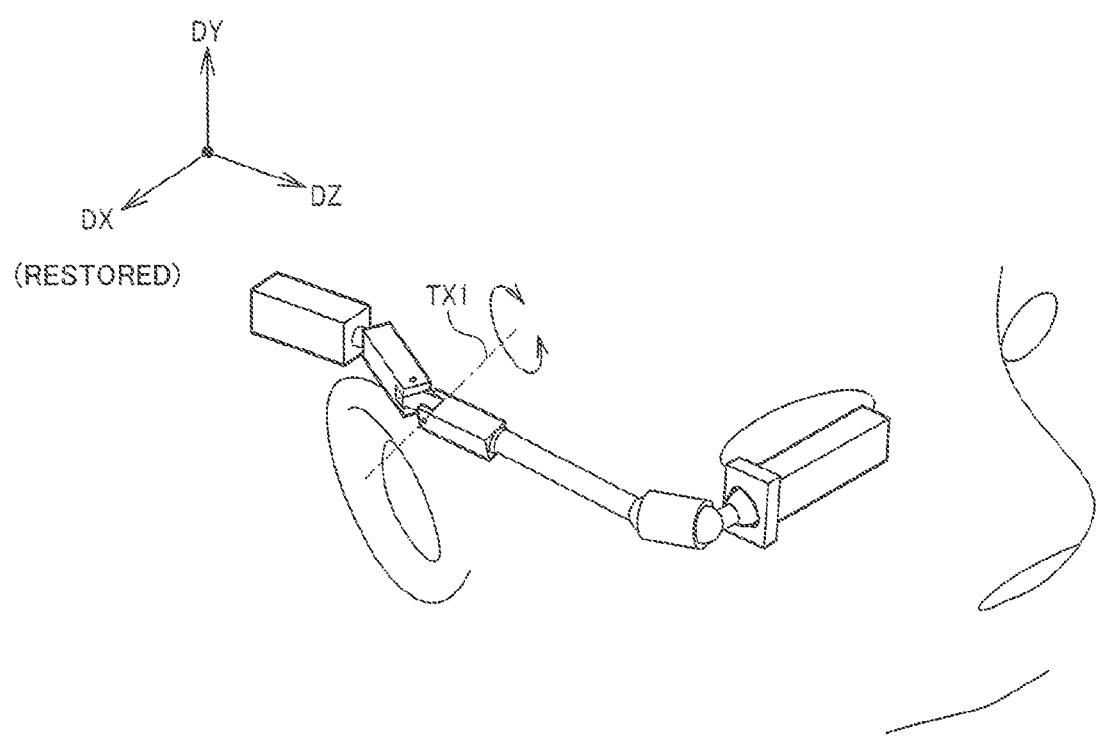
FIG. 8 is a view illustrating retraction and restoration of a display.

Once the adjustment described above is performed, the display 140 can be retracted and restored through the rotation around the first axis TX1 only, as illustrated in FIG. 7 and FIG. 8. Specifically, the arm 130 is rotated around the first axis TX1 so that the display 140 is retracted to be in the upward direction (or in the downward direction) as illustrated in FIG. 7, in cases where the user wants to see an object closely or perform detailed work for example. Thus, the display image can be removed from the field of view or can be moved to a peripheral portion of the field of view. The arm 130 is rotated around the first axis TX1 so that the display 140 is restored to be in front of the eye as illustrated in FIG. 8, when the user wants to obtain information from the display image again. As a result, the display image is displayed in the field of view again, or is moved from the peripheral portion of the field of view to a desired position.

The retraction and the restoration are implemented by applying force onto one end of the arm 130 (an end coupled with the display 140) with a finger. This process involves no rotation around the second axis TX2 as described above. The rotation around the third axis TX3 is less likely to occur because the third axis TX3 intersects with the first axis TX1. If the ball joint is used, the ball joint may rotate, and thus the ball joint is designed to be rotated by force larger than that for causing the rotation around the first axis TX1. This will be described in detail later.

In the example of the embodiment described above, the third joint (third axis rotation mechanism) is a ball joint. However, this should not be construed in a limiting sense, and the third joint may be a joint enabling rotation in the third axis TX3 only. In the example of the embodiment described above, the third joint is provided between the second joint (second axis rotation mechanism) and the wearable element. However, this should not be construed in a limiting sense, and the second joint may be provided between the third joint and the wearable element.

3. Modification of Coupling Element

In the example described above with reference to FIG. 3 to FIG. 7, the joint is provided to each of the three axes TX1 to TX3. However, the configuration of the coupling element 110 illustrated in FIGS. 1 and 2 is not limited to this. Specifically, any configuration with a mechanism that can adjust the first axis TX1 to be in the direction along both eyes can be employed. For example, a possible modification where the rotation around the second axis TX2 and the third axis TX2 is implemented with a single joint will be described below.

In this modification, the second rotation mechanism 112 illustrated in FIGS. 1 and 2 includes a single joint enabling rotation with a degree of freedom including rotation around the second axis TX2 and the third axis TX3. For example, the joint enables rotation around any axis including the second axis TX2 and the third axis TX3. For example, the joint is a ball joint. In an alternative example, a pin joint enabling rotation around two axes may be employed.

Figure 9:
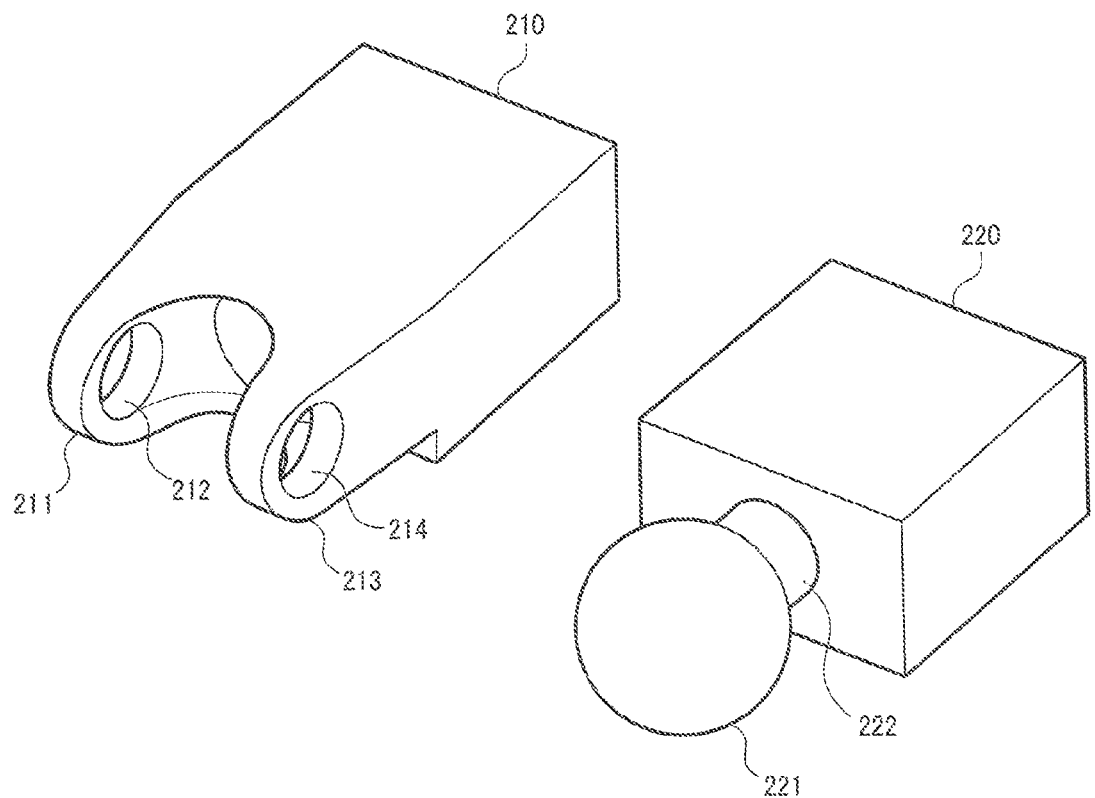
FIG. 9 illustrates a configuration example of a ball joint.

FIG. 9 illustrates a configuration example of a ball joint. The ball joint includes a ball-receiver side member 210 and a ball-side member 220. One of these members is fixed to the first contact element 10 and the other one of these members is coupled to the arm 130 via the first rotation mechanism 111.

The member 210 is provided with two protrusions 211 and 213 defining a rectangular U-shape (U-shape). The two protrusions 211 and 213 have inner surfaces provided with holes (or dents) 212 and 214 in which a ball 221 is fit and slides.

The member 220 is provided with the ball 221 via a shaft member 222 having a cylindrical shape. The members 210 and 220 are made of resin for example.

Figure 10:
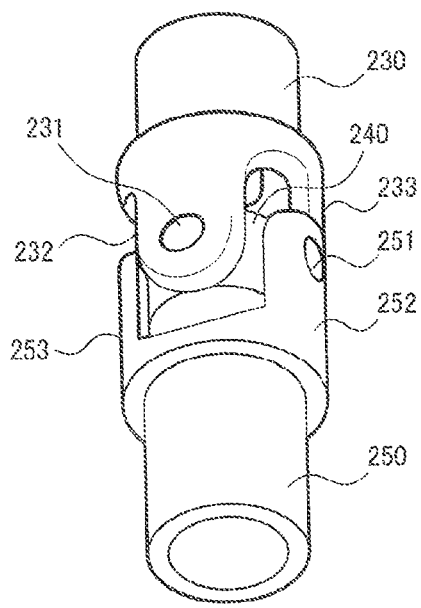
FIG. 10 illustrates a configuration example of a pin joint.

FIG. 10 illustrates a configuration example of a pin joint. The pin joint includes a member 230 serving as a first link, a member 250 serving as a second link, and a coupling member 240 coupling the first and the second links to each other. One of the members 230 and 250 is fixed to the first contact element 10 and the other one of the members 230 and 250 is coupled to the arm 130 via the first rotation mechanism 111.

The member 230 is provided with two protrusions 232 and 233 defining a rectangular U-shape (U-shape). The two protrusions 232 and 233 are provided with holes through which a pin 231 is inserted. Similarly, the member 250 is provided with two protrusions 252 and 253 defining a rectangular U-shape (U-shape). The two protrusions 252 and 253 are provided with holes through which a pin 251 is inserted.

The coupling member 240 is provided with the two pins 231 and 251, protruding in a cross form. The pins 231 and 251 extend in directions orthogonal to each other. For example, one of the pins corresponds to the second axis TX2 and the other one of the pins corresponds to the third axis TX3.

4. Holding Force of Coupling Element for Each Axis

As described above, in the present embodiment, the first axis TX1 is adjusted to be in parallel with the left and right direction (DX) of the head 70, and then the display 140 is retracted and restored through rotation around the first axis TX1. In this process, the rotation around an axis other than the first axis TX1 preferably does not occur (or is not likely to occur).

Thus, in the present embodiment, when the arm 130 is rotated around the first axis TX1, holding force of the second rotation mechanism 112 for holding the arm 130 is larger than holding force of the first rotation mechanism 111 for holding the arm 130.

The holding force is force for preventing the rotation of the arm 130 by a rotation mechanism. In other words, the holding force represents the minimum force required to cause the rotation mechanism to start rotating the arm 130. For example, the display 140 is retracted or restored with upward force applied with one end of the arm 130, on the side to be coupled to the display 140, held by fingers. In this process, torque corresponding to the force thus applied is applied to the first rotation mechanism 111 or the second rotation mechanism 112 to cause the rotation by the rotation mechanism. It is assumed that holding force F2 represents the minimum force (force applied to one end of the arm 130) for starting the rotation of the second rotation mechanism 112 with the first rotation mechanism 111 fixed to be immobilized. Similarly, it is assumed that holding force F1 represents the minimum force (force applied to one end of the arm 130) for starting the rotation of the first rotation mechanism 111 with the second rotation mechanism 112 fixed to be immobilized. Here, F1<F2 holds true. The force is actually applied as torque to each rotation mechanism, and thus, the holding force corresponding to the torque is set to satisfy F1<F2.

The holding force for the rotation mechanism as described above can be adjusted by a method of adjusting frictional force, a method of using a latch mechanism, a method of using a lock mechanism, or the other like method for example. In the example where the rotation mechanism is independently provided to each other three axes as described above with reference to FIG. 3 to FIG. 8, the relationship of the holding force is implemented with the second axis TX2 set to be orthogonal to the first axis TX1. Specifically, even when the rotation around the second axis TX2 can be implemented with small force, the rotation around the second axis TX2 is less likely to be caused by the rotation around the first axis TX1.

The method of adjusting the frictional force is implemented with the maximum value of static frictional force for the rotation of a joint (the static frictional force immediately before the movement start. Hereinafter, simply referred to as static frictional force) set to satisfy F1<F2. The static frictional force is determined based on the material of joint at a sliding portion, surface process, or force for pressing sliding surfaces to each other.

For example, the static frictional force can be set in accordance with a frictional coefficient varying depending on the material and the surface processing. Alternatively, the static frictional force can be set in accordance with a frictional force varying depending on force of fastening a ball by a ball receiver in the ball joint or force of fastening the pin by a hole through which the pin is inserted in the pin joint. For example, F1<F2 is satisfied with the static frictional force of the second rotation mechanism 112 set to be larger than that of the first rotation mechanism 111.

In the method of using the latch mechanism, F1<F2 is satisfied with latch holding force. For example, the latch mechanism may not be utilized for the first rotation mechanism 111 and may be utilized for the second rotation mechanism 112, so that the second rotation mechanism 112 does not rotate at the time of retraction or restoration.

Figure 11:
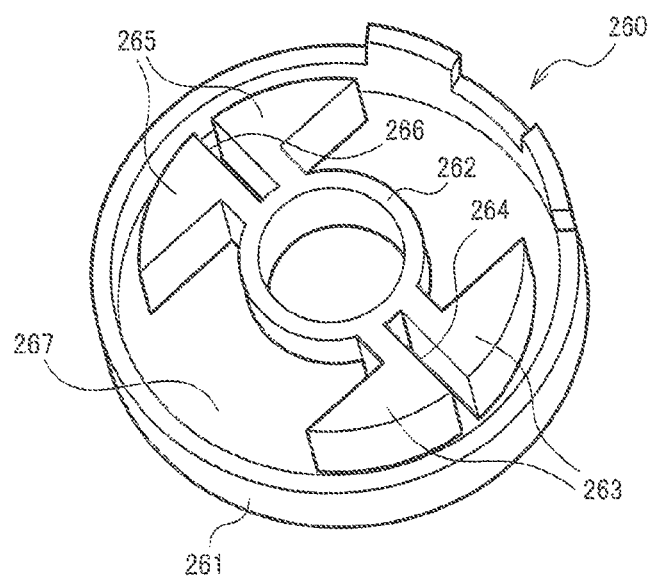
FIG. 11 illustrates a configuration example of a joint with a latch mechanism.
Figure 11:
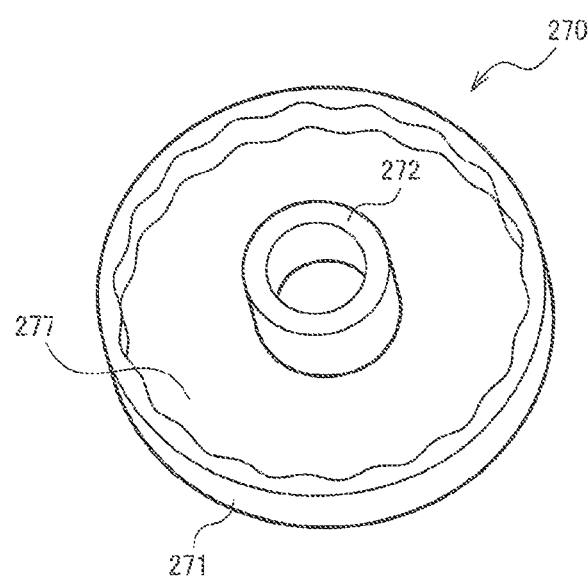

FIG. 11 illustrates a configuration example of a joint with a latch mechanism. This joint enables rotation around a single axis. For example, the second rotation mechanism 112 may be formed with this joint combined with two or three axes. The latch mechanism illustrated in FIG. 11 includes a member 260 provided with latch claws and a member 270 provided with a latch protrusion.

The member 260 has a circular hole provided at the center of a disk 267, a cylinder 261 provided along the outer circumference of the disk, and a cylinder 262 provided along the outer circumference of the circular hole. Two pairs of claws 263 and 265 extend from the cylinder 262 toward the cylinder 261. The claws 263 are formed with a slit 264 provided between two elastic claws. Similarly, the claws 265 are formed with a slit 266 provided between two elastic claws. These claws are not fixed to the disk 267 and the elasticity of the claws enables the widths of the slits therebetween to be changed.

The member 270 has a circular hole provided at the center of a disk 277, a cylinder 271 provided along the outer circumference of the disk, and a cylinder 272 provided along the outer circumference of the circular hole. Recesses and protrusions (recesses and protrusions forming a waveform for example) are provided over the entire inner circumference of the cylinder 271.

The members 260 and 270 are combined with their surfaces illustrated in the figured laid on top of the other. In this process, the cylinder 271 is inserted between the cylinder 261 and the claws 263 and 265 of the member 260. The cylinder 272 is inserted to be on the inner side of the cylinder 262. A rotational axis of the joint passes through the center of the circular hole, and extends in a direction orthogonal to the disks 267 and 277. When the members 260 and 270 rotate around the rotational axis, the protrusions on the inner circumference of the cylinder 271 fit in the slits 264 and 266 of the claws to increase the resistance against the rotation. When rotational force is applied against the resistance, the protrusions are detached from the slits 264 and 266, and the next protrusions fit in the slits 264 and 266. In this manner, a rotating member is semi-fixed at discontinuous points (rotational angles).

In the method of using the lock mechanism, the second rotation mechanism 112 is provided with a lock mechanism so as not to rotate at the time of retraction or restoration. Specifically, the lock mechanism is unlocked when the first axis TX1 is adjusted to be in parallel with the left and right direction, the position of the display 140 is adjusted, or alignment is performed. The lock mechanism is locked when such adjustment is completed. The lock mechanism may be provided to the first rotation mechanism 111 to be unlocked at the time of retraction or restoration.

Figure 12:
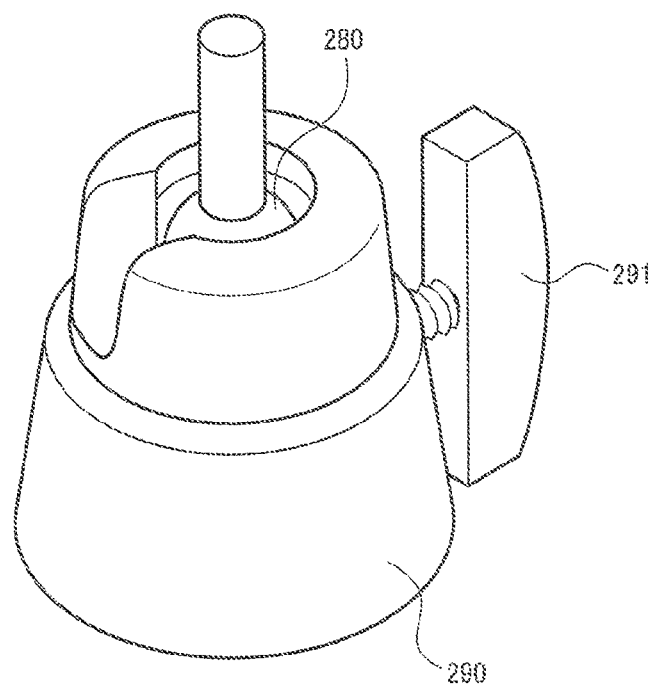
FIG. 12 illustrates a configuration example of a ball joint provided with a lock mechanism.

FIG. 12 illustrates a configuration example of a ball joint provided with a lock mechanism. The ball joint includes a ball 280, a ball receiver 290, and a fastening screw 291. The fastening screw 291 is a male screw that fits with a female screw of the ball receiver 290. For example, when the fastening screw 291 is fastened, a distal end of the male screw or a member pressed by the distal end of the male screw is pressed against the ball 280, thereby locking a sliding movement of the ball 280.

A similar lock mechanism may be implemented with a single-axis joint. For example, a joint including a shaft and a shaft receiver may have the shaft receiver provided with a fastening screw, and a sliding movement of the shaft may be locked by fastening the fastening screw.

When the lock mechanism is utilized, the second rotation mechanism 112 may include a lock mechanism that locks the rotation around at least one of the second axis TX2 and the third axis TX3. Specifically, a lock mechanism is provided for locking rotation around the second axis TX2 only, around the third axis TX3 only, or around both of the second axis TX2 and the third axis TX3.

For example, when the second rotation mechanism 112 includes a ball joint, the lock mechanism illustrated in FIG. 12 may be utilized so that rotation around both of the second axis TX2 and the third axis TX3 can be locked. Alternatively, in the configuration of the coupling element 110 described with reference to FIG. 3 to FIG. 8, a lock mechanism may be utilized for the third joint corresponding to the third axis TX3, so that only the rotation around the third axis TX3 can be locked.

The lock mechanism is not limited to the configuration based on the screw fastening as illustrated in FIG. 12. For example, a mechanism such as a pinchcock used for fastening a tube or the like may be employed. Such a mechanism is normally in a fastening (lock) state and enables the fastening (lock) to be temporarily released. For example, when such a mechanism is utilized for the ball joint, a tube fastening element of the pinchcock clamps the ball. Specifically, the ball is rotatable while the pinchcock is being pinched, and the rotation of the ball is locked when the pinchcock is released. When such a lock mechanism is utilized, the pinchcock is released upon terminating the adjustment so that the locking is automatically activated, whereby a user load can be reduced.

5. Modification of First Rotation Mechanism

FIG. 13A to FIG. 13D illustrate a modification of the configuration example of the first rotation mechanism 111. The modification of the configuration example features a configuration of limiting the rotation range, or a point at which the rotating member is semi-fixed, enabling the display 140 to accurately restore the position before the retraction.

Figure 13A:
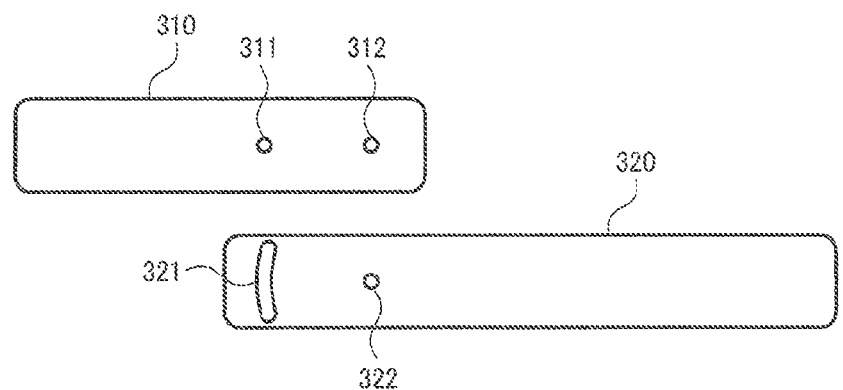
FIG. 13A to FIG. 13D illustrate a modification of a configuration example of a first rotation mechanism.

As illustrated in FIG. 13A, thin cylindrical protrusions 311 and 312 are provided on an elongated plate-shaped member 310. An elongated plate-shaped member 320 is provided with a circular hole 322, and an arc-shaped hole 321 centered on the circular hole 322. The member 320 corresponds to the arm 130 in FIG. 1 and the like, and has one end (one end on the side opposite to the protrusion 312) coupled with the display 140. The member 320 has one end (one end on the side opposite to the hole 321) coupled with the first contact element 10 via the second rotation mechanism 112. The shape of the members 310 and 320 is not limited to a plate shape, and may be any shape enabling the rotation around the protrusion 312 serving as the rotational axis, when the members 310 and 320 are combined.

Figure 13B:
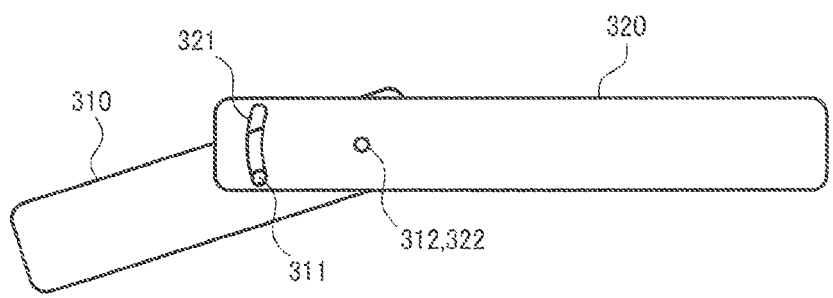

As illustrated in FIG. 13B, the members 310 and 320 are combined with the protrusion 311 inserted in the hole 321 and the protrusion 312 inserted in the hole 322. Then, the member 310 is rotated around the protrusion 312 serving as the rotation axis (corresponding to the first axis TX1) while moving the protrusion 311 along the arc-shaped hole 321.

Figure 13C:
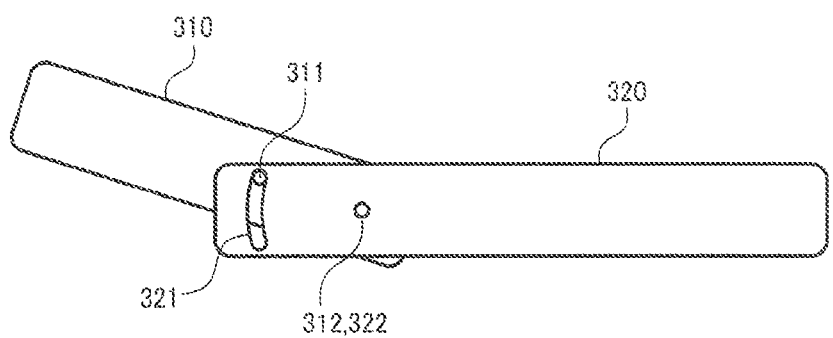

The protrusion 311 is designed to abut with the lower end of the arc-shaped hole 321 when the first axis TX1 is adjusted to be in the left and right direction, or when the position adjustment/alignment of the display 140 is performed. As illustrated in FIG. 13C, the display 140 is retracted with the member 310 (arm 130) rotated upward until the protrusion 311 abuts with the upper end of the arc-shaped hole 321. At the time of restoration, the member 310 is rotated downward until the protrusion 311 abuts with the lower end of the arc-shaped hole 321 as illustrated in FIG. 13B. In this manner, the display 140 can be easily and accurately restored to the position before the retraction.

Figure 13D:
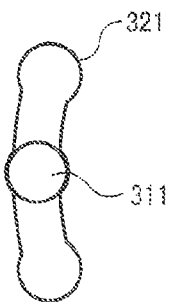

FIG. 13D illustrates a modification of the configuration example where a point for semi-fixing the rotating member is further provided. Specifically, a latch for semi-fixing the protrusion 311 is provided at a plurality of positions of the arc-shaped hole 321. In the example illustrated in FIG. 13D, the latch is provided at both ends and at the center of the arc.

At the time of adjustment, the protrusion 311 is semi-fixed at any of these plurality of latches (at the center latch as illustrated in FIG. 13D for example), and at the time of retraction, the member 310 is rotated to move the protrusion 311 to another one of the latch. The display 140 can be restored to the position before the retraction with the member 310 rotated until the protrusion 311 returns to the original latch.

6. Position of First Axis

Figure 14:
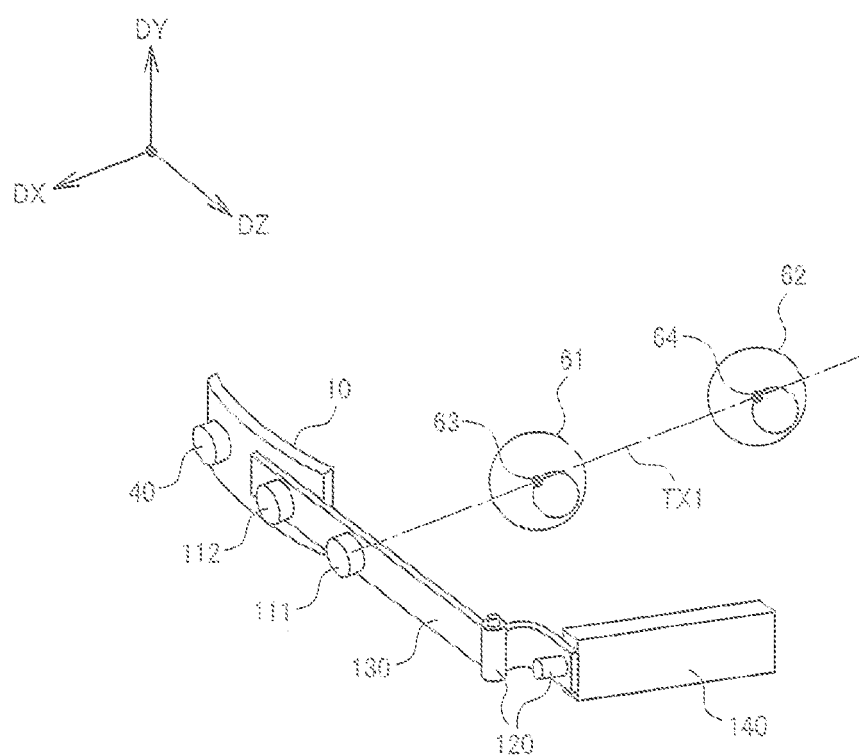
FIG. 14 is a view illustrating a setting example of a position of a first axis.

The position of the first axis TX1 is not particularly limited. The first axis TX1 may be set to be at the position as illustrated in FIG. 14 for example so that not only the retraction and restoration of the display 140 but also the upward and downward movement of the image display position can be simplified.

Specifically, the first axis TX1 passes through eyeballs 61 and 62 of the user upon being adjusted to be in parallel with a direction along both eyes of the user with the second rotation mechanism 112 in a state where the wearable device 100 is worn on the head 70.

The size of the eyeballs 61 and 62 varies among individual users. Thus, the first axis TX1 is designed to intersect with the eyeballs 61 and 62 assumed to have a statistic average diameter for example. The first axis TX1 is preferably within a radius of 5 mm from centers 63 and 64 of the eyeballs 61 and 62, and more preferably passes through the centers 63 and 64 of the eyeballs 61 and 62. Furthermore, the first axis TX1 needs to pass through the eyeball (the right eyeball 61 in FIG. 14) with which the display image is visually recognized, and does not necessarily need to pass through both eyeballs.

For example, the first coupling element 40, coupling the first contact element 10 and the headband 30 to each other, is disposed above an ear. The position of the second rotation mechanism 112, the distance between the second rotation mechanism 112 and the first rotation mechanism 111, and the like are determined based on a known positional relationship between the ear and the eyeball (average positional relationship) on the head 70 as viewed in the lateral direction (DX). Thus, the coupling element 110 is designed in such a manner that the first axis TX1 passes through the eyeballs 61 and 62.

Figure 15A:
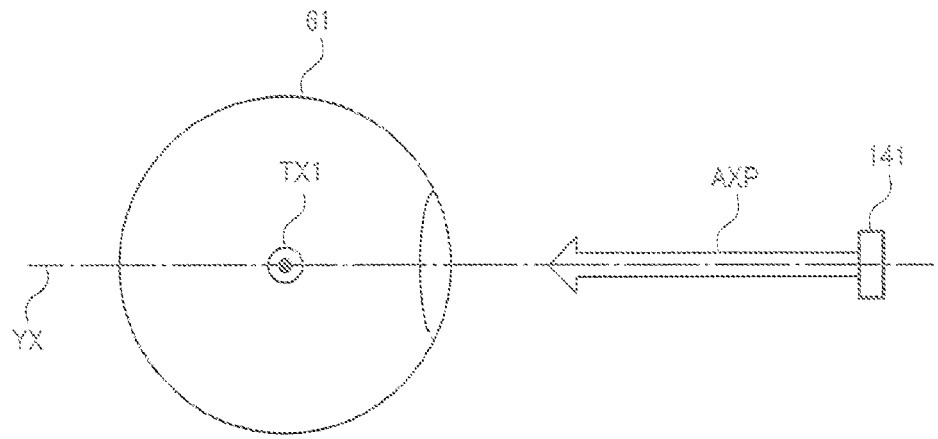
FIG. 15A to FIG. 15C are views illustrating setting examples of the position of the first axis.

The upward and downward movement of the image display position is described below. As illustrated in FIG. 15A, the position adjustment and alignment of the display 140 are performed so that the line of sight YX (visual axis) matches (including substantially matching) an optical axis AXP of the eyepiece element 141 of the display 140 to enable the display image to be visually recognized.

Figure 15B:
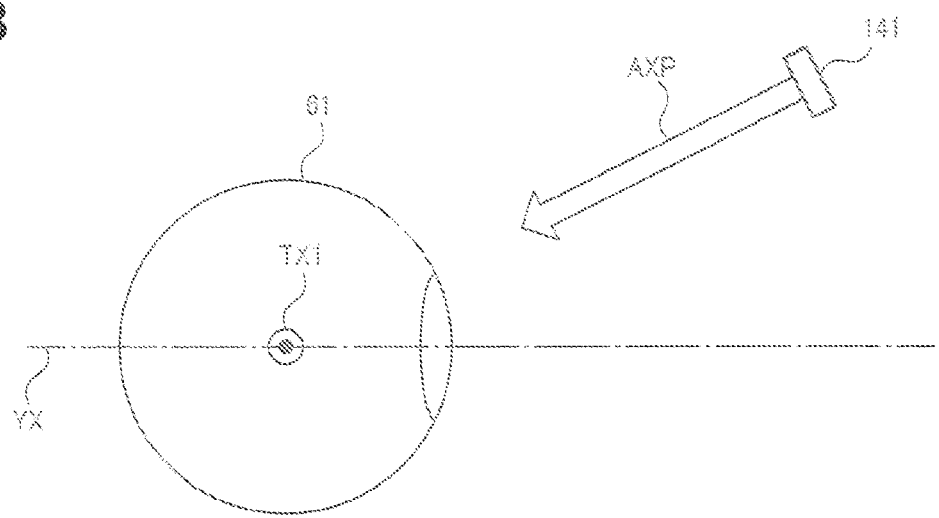

As illustrated in FIG. 15B, the display 140 is assumed to be moved with the arm 130 rotated around the first axis TX1. When the first axis TX1 passes through the center of the eyeball 61, the optical axis AXP of the eyepiece element 141 remains oriented toward the center of the eyeball 61.

Figure 15C:
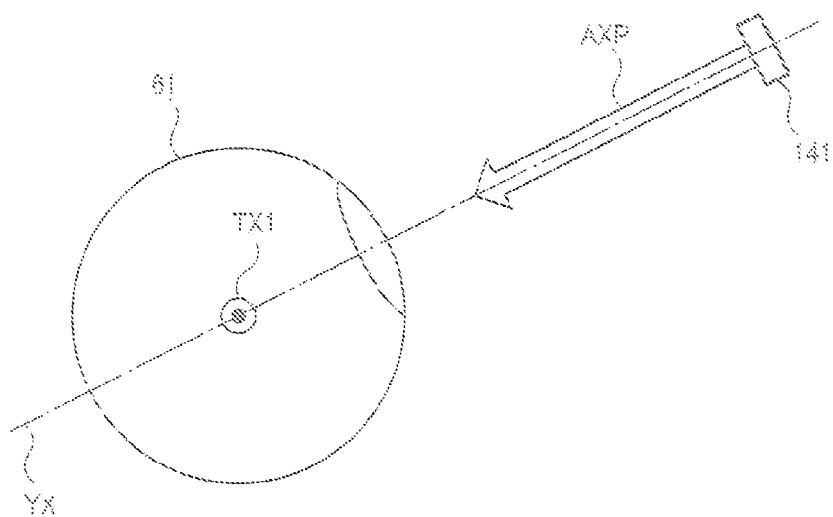

Thus, as illustrated in FIG. 15C, the line of sight YX may be directed toward the eyepiece element 141 to match the optical axis AXP. As a result, the display image can be visually recognized.

As described above, once the first axis TX1 is set to pass through the center of the eyeball 61 so that the display image can be visually recognized, the state where the display image can be visually recognized (when the line of sight is oriented toward the eyepiece element 141) can be maintained with no realignment even when the position of the display image moves upward or downward.

A slight deviation of the first axis TX1 from the center of the eyeball 61 does not require the realignment for a change in the display position, as long as the deviation is within a range of an eye-box (a tolerable range of deviation between the line of sight and the optical axis (a range of deviation still enabling the display image to be visually recognized)). Even when the range of the eye-box is overwhelmed, only a slight adjustment is required to enable the display image to be visually recognized. Thus, not cumbersome realignment is required.

The rotation mechanism 120, rotating the display 140 with respect to the arm 130, is preferably provided with an adjustment axis in the left and right direction (DX, that is, in a direction of the first axis TX1 after the adjustment). The deviation between the line of sight YX and the optical axis AXP as a result of the rotation around the first axis TX1 occurs within a plane orthogonal to the first axis TX1. Thus, the alignment can easily be achieved through rotation of the optical axis AXP around the adjustment axis in parallel with the plane.

The embodiments to which the invention is applied and the modifications thereof have been described above. Note that the invention is not limited to the above embodiments and the modifications thereof. Various modifications and variations may be made without departing from the scope of the invention. A plurality of elements described in connection with the above embodiments and the modifications thereof may be appropriately combined to implement various configurations. For example, some elements may be omitted from the elements described in connection with the above embodiments and the modifications thereof. Some of the elements described above in connection with different embodiments or modifications thereof may be appropriately combined. Specifically, various modifications and applications are possible without materially departing from the novel teachings and advantages of the invention. Any term cited with a different term having a broader meaning or the same meaning at least once in the specification and the drawings can be replaced by the different term in any place in the specification and the drawings.

What is claimed is:

1. A wearable device comprising:
   a wearable element mounted on a head of a wearer;
   a display that displays an image in a part of a field of view of the wearer;
   an arm that holds the display; and
   a coupling element that couples the arm and the wearable element to each other;
   wherein the coupling element includes:
      a first rotation mechanism capable of rotating the arm around a first axis; and
      a second rotation mechanism that is provided closer to the wearable element than the first rotation mechanism, and is capable of rotating the arm with a degree of freedom including rotation around at least a second axis and a third axis, the second axis being orthogonal to the first axis, the third axis being orthogonal to the second axis and intersecting with the first axis.

2. The wearable device according to claim 1,
   wherein in a state where the wearable device is worn on the head, the first axis corresponding to the first rotation mechanism is adjusted to be in parallel with a direction along both eyes of the wearer, with the arm rotated by the second rotation mechanism.

3. The wearable device according to claim 1,
   wherein in a state where the wearable device is worn on the head, the second axis is adjusted to be in parallel with an upward-downward direction of the head with the arm rotated around the third axis, and the first axis is adjusted to be in parallel with a direction along both eyes of the wearer with the arm rotated around the second axis.

4. The wearable device according to claim 1,
   wherein the second rotation mechanism includes:
      a second axis rotation mechanism capable of rotating the arm around the second axis; and
      a third axis rotation mechanism that is provided closer to the wearable element than the second axis rotation mechanism, and is capable of rotating the arm with a degree of freedom including rotation around the third axis.

5. The wearable device according to claim 4,
   wherein the third axis rotation mechanism is a joint enabling rotation around any axis including the third axis.

6. The wearable device according to claim 1,
   wherein the second rotation mechanism is a joint enabling rotation around any axis including the second axis and the third axis.

7. The wearable device according to claim 1,
   wherein when the arm is rotated around the first axis, holding force of the second rotation mechanism for holding the arm is larger than holding force of the first rotation mechanism for holding the arm.

8. The wearable device according to claim 1,
   wherein the second rotation mechanism includes a lock mechanism that locks rotation around at least one of the second axis and the third axis.

9. The wearable device according to claim 1,
   wherein the first axis passes through an eyeball of the wearer upon being adjusted to be in parallel with a direction along both eyes of the wearer with the second rotation mechanism in a state where the wearable device is worn on the head.

10. An adjustment method for the wearable device according to claim 1, the method comprising adjusting the first axis to be in parallel with a direction along both eyes of the wearer by rotating the arm with the second rotation mechanism.

11. An adjustment method for the wearable device according to claim 1, the method comprising:
   adjusting the second axis to be in parallel with an upward-downward direction of the head by rotating the arm around the third axis; and
   adjusting the first axis to be in parallel with a direction along both eyes of the wearer by rotating the arm around the second axis.

* * * * *